United States Patent [19]

Hattori et al.

[11] 4,258,683
[45] Mar. 31, 1981

[54] ELECTRONIC IGNITION CONTROL APPARATUS

[75] Inventors: Tadashi Hattori, Okazaki; Mamoru Kobashi, Aichi; Tooru Kawase, Toyota; Yoshiki Ueno, Okazaki, all of Japan

[73] Assignees: Nippon Soken, Inc., Nishio; Toyota Jidosha Kogyo Kabushiki Kaisha, Toyota, both of Japan

[21] Appl. No.: 895,013

[22] Filed: Apr. 10, 1978

[30] Foreign Application Priority Data

Apr. 14, 1977 [JP] Japan .................. 52-42874

[51] Int. Cl.³ .............................................. F02P 5/04
[52] U.S. Cl. .................................................. 123/416
[58] Field of Search ....... 123/117 D, 117 R, 146.5 A, 123/32 EB, 32 EC; 364/424, 431, 442

[56] References Cited

U.S. PATENT DOCUMENTS

| | | | |
|---|---|---|---|
| 3,927,648 | 12/1975 | Kawai et al. | 123/117 D |
| 3,996,911 | 12/1976 | Canup | 123/117 D |
| 4,000,724 | 1/1977 | Fowler | 123/117 R |
| 4,015,563 | 4/1977 | Drews et al. | 123/32 ED |
| 4,015,566 | 4/1977 | Wahl | 123/117 R |
| 4,036,190 | 7/1977 | Bigliani et al. | 123/117 D |
| 4,040,401 | 8/1977 | Marsee | 123/119 A |
| 4,052,967 | 10/1977 | Colling et al. | 123/117 D |
| 4,063,539 | 12/1977 | Gorille et al. | 123/117 D |
| 4,114,573 | 9/1978 | Mori | 123/117 D |

FOREIGN PATENT DOCUMENTS

1470517  4/1977  United Kingdom ............... 123/117 D

Primary Examiner—Charles J. Myhre
Assistant Examiner—Andrew M. Dolinar
Attorney, Agent, or Firm—Cushman, Darby & Cushman

[57] ABSTRACT

To determine an optimum spark advance angle for activation of a spark plug, memory means is provided to previously store a data indicating a plurality of optimum spark advance angles for activation of the spark plug in relation to each amount of air sucked into an engine and each rotation speed of an output shaft of the engine, thereby to simplify construction of the control apparatus.

1 Claim, 7 Drawing Figures

ELECTRONIC IGNITION CONTROL APPARATUS

BACKGROUND OF THE INVENTION

The present invention relates to an electronic control apparatus for internal combustion engines, and more particularly to an electronic ignition control apparatus to determine an optimum timing of sparks supplied to the engine in accordance with changes of operating condition of the engine.

SUMMARY OF THE INVENTION

The primary object of the present invention is to provide an electronic ignition control apparatus wherein to determine an optimum spark advance angle for activation of each spark plug. Memory means is provided to previously store a data indicating a plurality of optimum spark advance angles for activation of the spark plug in relation to each amount of air sucked into an engine and each rotation speed of an output shaft of the engine, thereby to simplify construction of the control apparatus.

According to the present invention, there is provided an electronic ignition control apparatus for an internal combustion engine having an output shaft rotated by a piston, an ignition coil adapted to generate a spark voltage upon deenergization of the primary winding thereof and a spark plug activated by the spark voltage to ignite the air-fuel mixture metered into a combustion chamber of the engine so as to operate the piston, the control apparatus comprising:
- a first signal generator for producing a first signal at each rotation of the output shaft;
- a second signal generator for producing a second binary signal indicative of rotation speed of the output shaft in response to the first signal;
- a third signal generator for producing a third binary signal indicative of an amount of air sucked into the combustion chamber of the engine in response to the first signal;
- memory means for storing a data indicating a plurality of optimum spark advance angles for activation of the spark plug in relation to each rotation speed of the output shaft and each amount of the sucked air, the memory means producing a fourth binary signal representing one of the optimum spark advance angles in accordance with the second and third binary signals;
- a timing signal generator for generating a timing signal in accordance with the fourth binary signal; and
- means for deenergizing the primary winding of the ignition coil in response to the timing signal.

Figure 1:
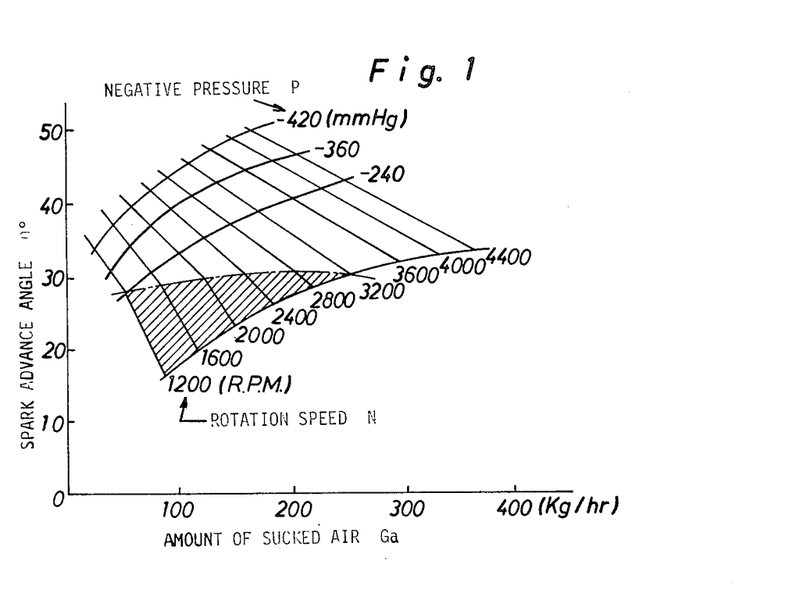
FIG. 1 depicts a graph indicative of an optimum spark advance angle $\theta°$ in relation to an amount Ga of air sucked into an internal combustion engine in consideration with engine detonation.
Figure 5:
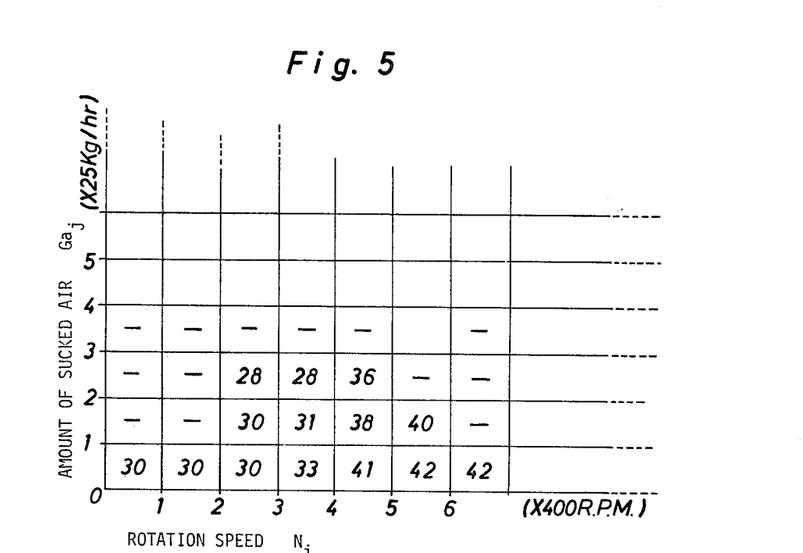
FIG. 5 depicts a graph or map indicative of an optimum spark advance angle $\theta_{ij}°$ in relation to rotation speed $N_i$ and amount $Ga_j$ of the sucked air in consideration with engine detonation.

For an actual practice of the present invention, at the first stage of an experimentation conducted by the inventors, a relationship between an optimum spark advance angle and an amount of air sucked into an engine in consideration with negative pressure in the air suction passage of the engine was obtained as shown by a plurality of characteristic curves in FIG. 1. At the second stage, based on the above-noted relationship, the inventors obtained another relationship between the optimum spark advance angle and the amount of the sucked air in consideration with rotation speed and a condition causing detonation in the engine, as shown by a plurality of straight lines in FIG. 1. At a final stage, based on the above-noted relationships, the inventors obtained a data representing a plurality of optimum spark advance angles in relation to each amount of the sucked air and each rotation speed, for example as shown by a graph or map in FIG. 5. In the map of FIG. 5, a plurality of rotation speeds $N_i$ are plotted along the axis of abscissas, while a plurality of amounts $Ga_j$ of the sucked air are plotted along the axis of ordinates. An optimum spark advance angle in relation to an instant rotation speed N and an instant amount Ga of the sucked air in consideration with the condition causing detonation in the engine is given by a value $\theta_{ij}°$ which is indicated in a specified range defined by rotation speeds $N_{i-1}$ and $N_i$ and amounts $Ga_{j-1}$ and $Ga_j$ of the sucked air, the instant rotation speed N and the instant amount Ga of the sucked air being in the above specified range.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 2:
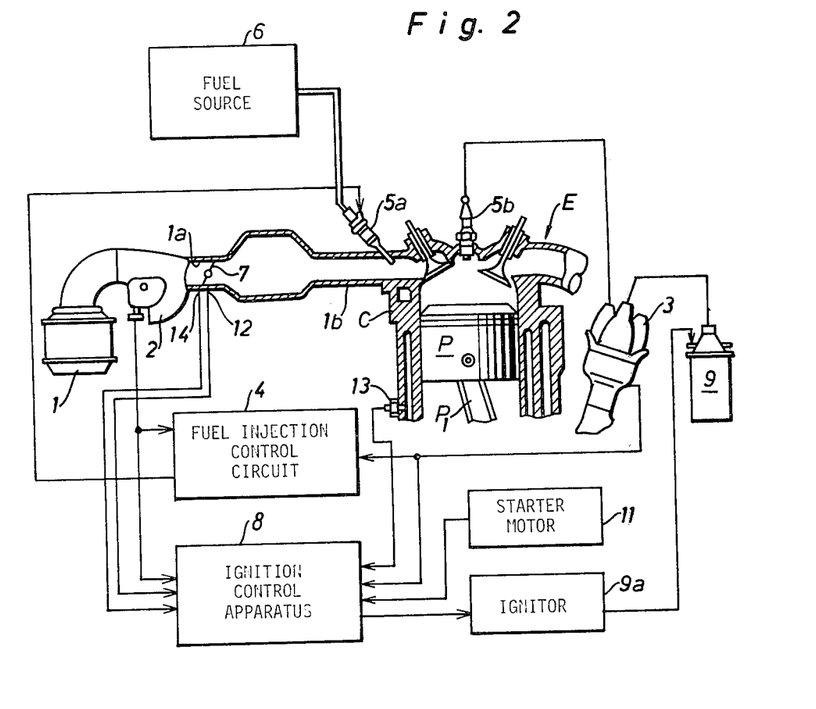
FIG. 2 is a schematic block diagram of an electronic control system for the engine including an electronic ignition control apparatus in accordance with the present invention.

Referring now to the accompanying drawings, in particular to FIG. 2 there is illustrated a schematic block diagram of an electronic control system for an internal combustion engine E including an electronic ignition control apparatus 8 in accordance with the present invention.

The engine E is of a conventional four cylinder, four stroke type and comprises a piston P reciprocable within each cylinder C. The piston P is connected by way of a connecting rod $P_1$ to a crankshaft (not shown) to rotate the crankshaft in response to reciprocation thereof. The engine E also comprises four fuel injectors 5a mounted on an intake manifold 1b and four spark plugs 5b mounted on a cylinder head. Each fuel injector 5a is activated by receiving each electric signal from a fuel injection control circuit 4 to supply fuel from a fuel source 6 into the cylinder C. Each spark plug 5b is energized by a spark voltage from a distributor 3 to produce a spark for igniting air-fuel mixture within the cylinder C. The distributor 3 is provided to distribute the spark voltage from an ignition coil 9 to each spark plug 5b at appropriate intervals.

The electronic control system comprises an air flow meter 2 provided within an induction passage 1a and a signal generator 10 (see FIG. 3) provided within the distributor 3. The air flow meter 2 detects an amount of air sucked into the engine E from an air cleaner 1 through the induction passage 1a and a throttle valve 7 to produce an electric signal indicative of an amount of the sucked air. The signal generator 10 includes a reference signal generator 10a for producing four reference signals a with a predetermined angular width $\theta_T°$ per two rotations of the crankshaft (See FIG. 4). The signal generator 10 also includes a speed signal generator 10b for producing 720 angular signals b per two rotations of the crankshaft. Each reference signal a is generated upon the arrival of each piston C to its top dead center position, and each angular signal b is generated at a one-degree rotation of the crankshaft.

The electronic control system further comprises first and second throttle switches 12 and 14 provided with the throttle valve 7 and a crank switch (not shown) provided within a starter motor 11 operatively coupled with the crankshaft. The first throttle switch 12 closes only at fully closed position of the throttle valve 7, and the second throttle switch 14 closes only at fully opened position of the throttle valve 7. The crank switch is to be closed only under cranking operation of the engine E. A coolant temperature sensor 13 is provided in the engine cooling system to detect coolant temperature of the engine E. The fuel injection control circuit 4 receives electric signals from the air flow meter 2, the signal generator 10 and other sensors (not shown) to control an amount of fuel injected from the fuel injector 5a to an optimum value. The ignition control apparatus 8 receives the electric signals from the air flow meter 2 and the signal generator 10 to generate an optimal ignition timing signal under control by the throttle switches 12 and 14, the crank switch and the coolant temperature sensor 13. An ignitor 9a receives the ignition timing signal from the ignition control apparatus 8 to produce the spark voltage in the ignition coil 9.

Figure 3:
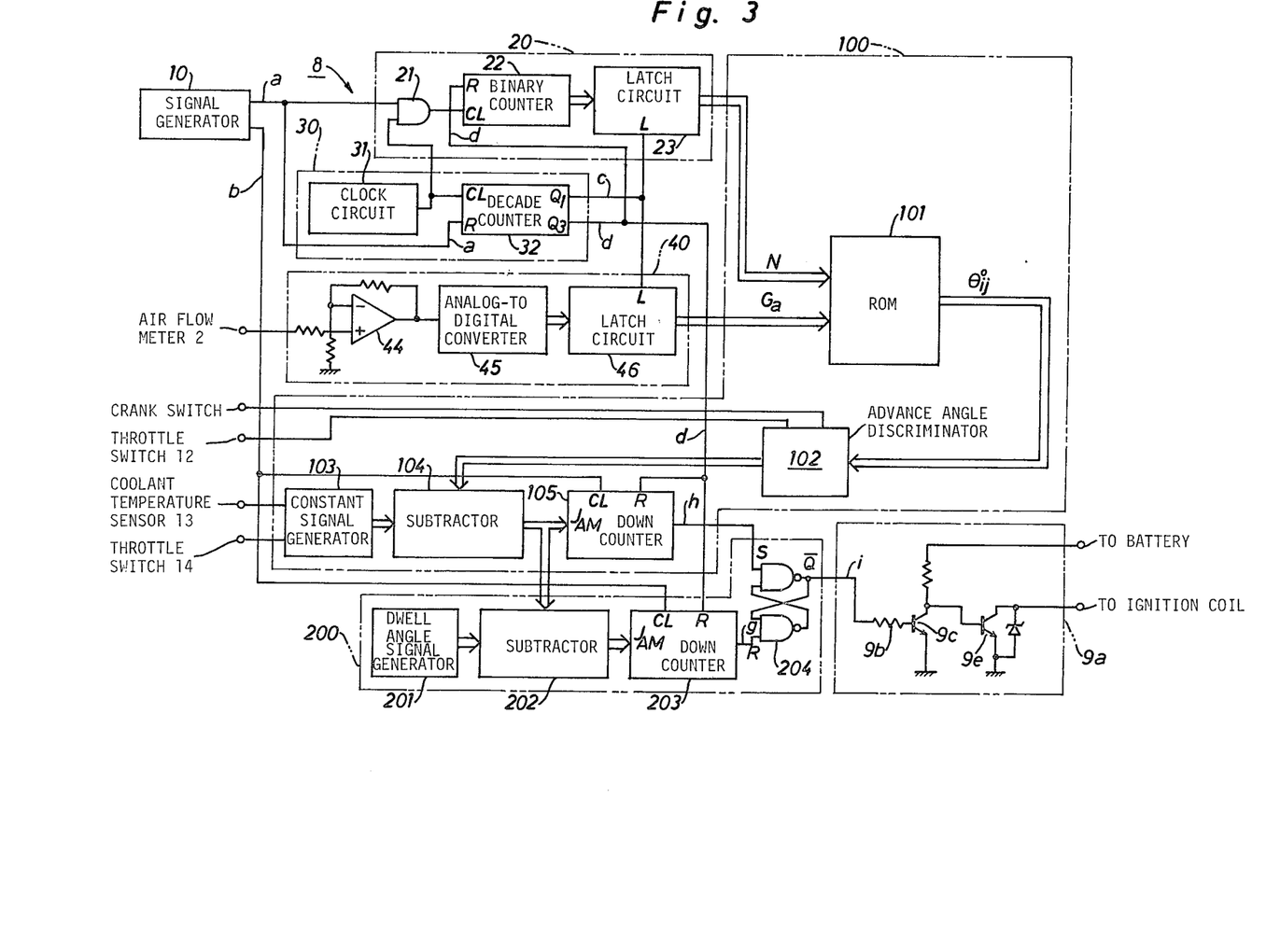
FIG. 3 is a circuit diagram of an embodiment of the ignition control apparatus illustrated in block form in FIG. 2.
Figure 4:
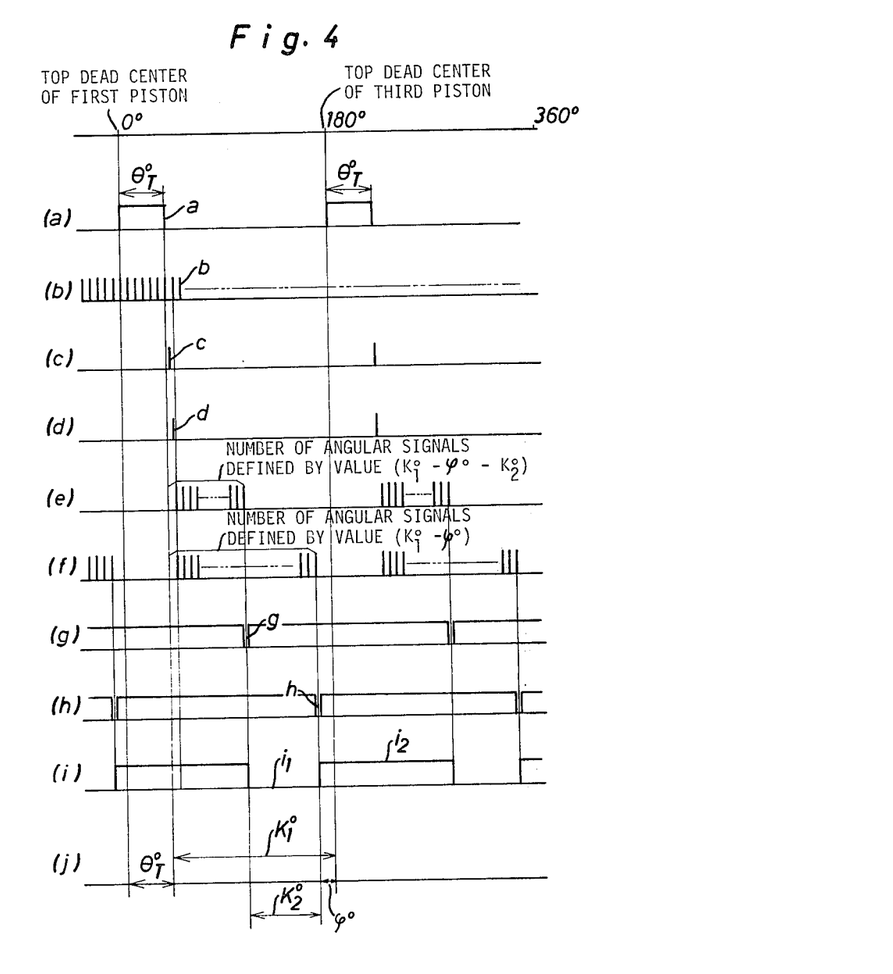
FIG. 4 illustrates waveforms obtained at various points in the ignition control apparatus of FIG. 3.

In FIG. 3, there is illustrated an embodiment of the ignition control apparatus 8 which is described hereinafter in detail. The ignition control apparatus 8 comprises a speed calculation circiut 20 driven by a timing circuit 30 in response to each reference signal a from the signal generator 10. The timing circuit 30 comprises a decade counter 32 to be reset by each reference signal a. The counter 32 counts clock pulses from a clock circuit 31 immediately after release of the reset condition thereof to generate at its output terminals $Q_1$ and $Q_3$ latch and reset signals c and d shown in FIG. 4. The latch and reset signals c and d appear sequentially within a period of time of the angular signal b immediately after a waveform of each reference signal a drops at its trailing edge.

The speed calculation circuit 20 includes a binary counter 22 for counting output pulses from an AND gate 21. AND gate 21 receives clock pulses from the clock circuit 31 in response to each reference signal a to generate therefrom the output pulses corresponding with the predetermined angular width $\theta_T°$ of each reference signal a. The binary counter 22 is reset upon receiving each reset signal A from the decade counter 32 to count the output pulses issued from AND gate 21 in response to a reference signal a following to each reset signal d. Then, the counter 22 generates a binary electric signal defined by the predetermined angular width $\theta_T°$ after completion of its count. In other words, the counter 22 generates the binary electric signal indicative of an instant rotation speed N at a half crankshaft rotation. A latch circuit 23 is provided to latch the binary electric signal from the counter 22 in response to each latch signal c.

In operation of the speed calculation circuit 20 relative to the timing circuit 30, assuming that the signal generator 10 generates a reference signal a therefrom, the reference signal a is applied to AND gate 21 and the decade counter 32. When AND gate 21 receives clock pulses from the clock circuit 31 in response to the reference signal a, output pulses are generated from AND gate 21 and applied to the counter 22. Simultaneously, the counter 32 is reset by the reference signal a to count clock pulses from the clock circuit 31 immediately after release of the reset condition thereof so as to sequentially generate latch and reset signals c and d therefrom. The latch signal c is applied to the latch circuit 23, and the reset signal d is applied to the counter 22. Then, a binary signal, which is previously produced from the counter 22 in response to a reset signal d prior to the above latch signal c, is latched and transferred by the latch circuit 23 to a first calculation circuit 100. Subsequently, the counter 22 is reset by the reset signal d to count the output pulses from AND gat 21 so as to generate another binary signal therefrom upon completion of its count.

The ignition control apparatus 8 further comprises a conversion circuit 40 for converting the electrical signal from the air flow meter 2 into a binary electric signal indicative of an amount Ga of the sucked air. The conversion circuit 40 includes a differential amplifier 44 for amplifying the electric signal from the air flow meter 2 and an analog-to-digital converter 45 for converting an output signal from the amplifier 44 into the binary electric signal indicative of an amount Ga of the sucked air. In the conversion circuit 40, a latch circuit 46 is provided to latch and transfer the binary electric signal from the converter 45 to the first calculation circuit 100 in response to each latch signal c from the decade counter 32.

The first calculation circuit 100 comprises a read only memory or ROM 101 for receiving the binary signals respectively indicative of an instant rotation speed N and an instant amount Ga of the sucked air from the latch circuits 23 and 46. ROM 101 previously stores therein the data indicating, as shown in FIG. 5, a plurality of optimum spark advance angles $\theta_{ij}°$ in relation to the rotation speed $N_i$ and the amount $Ga_j$ of the sucked air in consideration with a condition causing detonation in the engine E. With ROM 101, the optimum spark advance angle in relation to the instant rotation speed N and the instant amount Ga of the sucked air respectively defined by the binary signals from the latch circuits 23 and 46 is read out as a value $\theta_{ij}°$ in a specified range defined by the rotation speeds $N_{i-1}$ and $N_i$ and the amounts $Ga_{j-1}$ and $Ga_j$ of the sucked air, for example as in the following list, the instant rotation speed N and the instant amount Ga of the sucked air being in the above specified range.

| N (r.p.m.) | Ga (kg/hr) | θ (degree) |
|---|---|---|
| 1200–1600 | 0–25 | 33 |
| 1600–2000 | 0–25 | 41 |

-continued

| N (r.p.m.) | Ga (kg/hr) | θ (degree) |
|---|---|---|
| 1200–1600 | 25–50 | 31 |

The first calculation circuit 100 further comprises a spark advance angle discriminator 102 which is designed to transfer a binary signal indicative of a read out resultant value $\theta_{ij}°$ from ROM 101 to a subtractor 104 only when the crank switch and the first throttle switch 12 are opened. When the crank switch and the first throttle switch 12 are closed under cranking of the engine E, the discriminator 102 generates a binary signal indicative of a first predetermined advance angle $\theta_1°$ therefrom. When the crank switch is opened and the first throttle switch 12 is closed during idle operation of the engine E, the discriminator 102 generates a binary signal indicative of a second predetermined advance angle $\theta_2°$. The advance angles $\theta_1°$ and $\theta_2°$ are experimentally determined to ensure an optimum ignition timing of the engine E under cranking and idling operations respectively.

When one of the binary signals respectively indicative of the advance angles $\theta_1°$, $\theta_2°$ and $\theta_{ij}°$ is transferred to the subtractor 104 from the discriminator 102, an advance angle $\Phi°$ is subtracted from a constant $K_1°$ (see FIG. 4) defined by a binary signal from a constant signal generator 103, the character $\Phi°$ representing the character $\theta_1°$, $\theta_2°$ or $\theta_{ij}°$. The constant signal generator 103 produces the binary signal indicative of the constant $K_1°$ in accordance with operating conditions of the engine E under control by the coolant temperature sensor 13 and the second throttle switch 14. In this case, the constant $K_1°$ corresponds with a difference between 180° and $\theta_f°$ defined by the reference signal a. A down counter 105 is provided to receive the angular signals b from the signal generator 10 and a binary signal indicative of the subtracted value $(K_1°-\Phi°)$ from the subtractor 104. The down counter 105 is reset upon receiving a reset signal d from the decade counter 32 to count down a predetermined number of the angular signals b corresponding with the value $(K_1°-\Phi°)$ to zero. Thus, the counter 105 generates an output signal h therefrom upon completion of its count. The output signal h is applied to a flip-flop 204 of a second calculation circuit 200.

The second calculation circuit 200 comprises a dwell angle signal generator 201 for generating a binary signal indicative of a predetermined dwell angle $K_2°$ (See FIG. 4) and a subtractor 202 for receiving the binary signals from the signal generator 201 and the subtractor 104. In the subtractor 202, the predetermined dwell angle $K_2°$ is subtracted from the value $(K_1°-\Phi°)$ defined by the binary signal of the subtractor 104. A down counter 203 is provided to receive a binary signal indicative of a subtracted value $(K_{1-\Phi°-K_2})$ from the subtractor 202 and the angular signals b from the signal generator 10. The down counter 203 is reset upon receiving a reset signal d from the counter 32 to count down a predetermined number of the angular signals b corresponding with the value $(K_1°-\Phi-K_2°)$ to zero. Thus, the counter 203 generates therefrom an output signal g upon completion of its count.

The flip-flop 204 receives at its input terminal R the output signal g from the down counter 203 to generate a low level signal $i_1$ at its output terminal $\bar{Q}$, the low level signal $i_1$ having a width corresponding with the predetermined dwell angle $K_2°$. When the low level signal $i_1$ from the flip-flop 204 is applied to a transistor 9c of the ignitor 9a, the transistor 9c is turned off to cause conduction of a transistor 9e. Then, a low level signal appears from the transistor 9e and energizes the ignition coil 9 at the dwell angle $K_2°$. When the flip-flop 204 receives at its input terminal S the output signal h from the counter 105, it generates at its output terminal $\bar{Q}$ a high level signal $i_2$ which is applied to the transistor 9c as in an ignition timing signal. Then, the transistor 9c is turned on to cause non-conduction of the transistor 9e. Thus, a high level signal appears from the transistor 9e and deenergizes the ignition coil 9 at its leading edge.

Hereinafter, the operation of the ignition control apparatus 8 will be described in detail under various operating conditions of the engine E. Under cranking of the engine E, assuming that a reference signal a from the signal generator 10 is applied to AND gate 21 and the decade counter 32 and that angular signals b from the signal generator 10 are applied to the down counters 105 and 203, AND gate 21 receives clock pulses from the clock circuit 31 in response to the reference signal a to generate output pulses therefrom. Then, the output pulses from AND gate 21 are applied to the binary counter 22. Simultaneously, the counter 32 is reset by the reference signal a to count clock pulses from the clock circuit 31 and sequentially generates therefrom latch and reset signals c and d. The latch signal c is applied to the latch circuits 23 and 46, while the reset signal d is applied to the binary counter 22 and the down counters 105 and 203. Then, a binary signal, which is previously produced in the counter 22 in response to a reset signal d prior to the latch signal c, is latched and transferred by the latch circuit 23 to ROM 101 in response to the latch signal c. Meanwhile, an electric signal from the air flow meter 2 is amplified by the amplifier 44 and converted by the converter 45 into a binary signal indicative of an amount Ga of the sucked air. Then, the binary signal from the converter 45 is latched and transferred by the latch circuit 46 to ROM 101 in response to the latch signal c.

When ROM 101 receives the binary signals from the latch circuits 23 and 46 as described above, an optimum advance angle in relation to the instant rotation speed N and the instant amount Ga of the sucked air respectively defined by the binary signals from the latch circuits 23 and 46 is read out as a value $\theta_{ij}°$ in a specified range defined by the rotation speeds $N_{i-1}$ and $N_i$ and the amounts $Ga_{j-1}$ and $Ga_j$ of the sucked air, the instant rotation speed N and the instant amount Ga of the sucked air being in the above-noted specified range. Then, the read out resultant value $\theta_{ij}°$ is applied as a binary signal to the discriminator 102. In this instance, it should be noted that an instant amount of the sucked air may not properly be indicated by the binary signal from the latch circuit 46 because of cranking of the engine E. Thus, the discriminator 102 applies an electric signal indicative of the first predetermined advance angle $\theta_1°$ to the subtractor 104 under closings of the crank switch and the first throttle switch 12. Then, the first advance angle $\theta_1°$ is subtracted in the subtractor 104 from a constant $K_1°$ defined by a binary signal from the constant signal generator 103. Thereafter, a subtracted value $(K_1°-\theta_1°)$ is applied as a binary signal to the down counter 105 and the subtractor 202.

After the subtractor value $(K_1°-\theta_1°)$ is subtracted from the predetermined dwell angle $K_2°$ defined by a binary signal from the dwell angle signal generator 201, a binary signal indicative of a subtracted value ($K_1° - \theta_1° - K_2°$) is applied by the subtractor 202 to the down counter 203. When the down counter 203 is reset by the above-noted reset signal d from the counter 32, a predetermined number of the angular signals b corresponding with the value ($K_1° - \theta_1° - K_2°$) are counted down to zero by the counter 203. As a result, an output signal g appears from the counter 203 and is applied to the terminal R of the flip-flop 204. When the flip-flop 204 generates a low level signal $i_1$ therefrom in response to the output signal g, the low level signal $i_1$ is applied to the ignitor 9a to energize the ignition coil 9 at the dwell angle $K_2°$.

Meanwhile, when the down counter 105 is reset by the above-noted reset signal d from the counter 32, a predetermined number of the angular signals b corresponding with the subtracted value ($K_1° - \theta_1°$) are counted down to zero by the counter 105. Then, an output signal h appears from the down counter 105 and is applied to the terminal S of the flip-flop 204. When the flip-flop 204 generates a high level signal $i_2$ therefrom in response to the output signal h, the high level signal $i_2$ is applied to the ignitor 9a to deenergize the ignition coil 9. Thus, the ignition coil 9 generates a spark voltage therefrom in response to deenergization thereof.

In summary, during cranking of the engine E, it will be understood that the ignition control apparatus 8 produces an ignition timing signal in response to a reset signal d at each half crankshaft rotation by using the first predetermined advance angle $\theta_1°$ from the discriminator 102.

Under idling operation of the engine E after the cranking, the crank switch is opened and the first throttle switch 12 is still closed. Thus, the discriminator 102 applies an electric signal indicative of the second predetermined angle $\theta_2°$ to the subtractor 104. Thus, the second advance angle $\theta_2°$ is subtracted in the subtractor 104 from a constant $K_1°$ defined by a binary signal from the constant signal generator 103 and, thereafter, a subtracted value ($K_1° - \theta_2°$) is applied as a binary signal to the down counter 105 and the subtractor 202.

After the value ($K_1° - \theta_2°$) is subtracted in the subtractor 202 from the predetermined dwell angle $K_2°$ defined by a binary signal from the dwell angle signal generator 201, a binary signal indicative of a subtracted value ($K_1° - \theta_2° - K_2°$) is applied by the subtractor 202 to the down counter 203. When the down counter 203 is reset by a reset signal d from the counter 32, as previously described, a predetermined number of angular signals b corresponding with the value ($K_1° - \theta_2° - K_2°$) are counted down to zero by the counter 203. Then, an output signal g appears from the counter 203 and is applied to the terminal R of the flip-flop 204. When the flip-flop 204 generates a low level signal $i_1$ in response to the output signal g, the low level signal $i_1$ is applied to the ignitor 9a to energize the ignition coil 9 at the dwell angle $K_2°$.

Meanwhile, when the down counter 105 is reset by the reset signal d from the counter 32, a predetermined number of the angular signals b corresponding with the subtracted value ($K_1° - \theta_2°$) are counted down to zero by the counter 105. Then, an output signal h appears from the counter 105 and is applied to the terminal S of the flip-flop 204. When the flip-flop 204 generates a high level signal $i_2$ in response to the output signal h, the high level signal $i_2$ is applied as an ignition timing signal to the ignitor 9a to deenergize the ignition coil 9. Thus, the ignition coil 9 generates a spark voltage in response to deenergization thereof.

In summary, during idling of the engine E, it will be understood that the ignition control apparatus 8 produces an ignition timing signal in response to a reset signal d at each half crankshaft rotation by using the second predetermined advance angle $\theta_2°$ from the discriminator 102.

When the first throttle switch 12 and the crank switch are opened under travel of the vehicle, the discriminator 102 applies the binary signal indicative of the value $\theta_{ij}°$ to the subtractor 104. Then, the value $\theta_{ij}°$ is subtracted in the subtractor 104 from a constant $K_1°$ defined by a binary signal from the constant signal generator 103 and, thereafter, a subtracted value ($K_1° - \theta_{ij}°$) is applied as a binary signal to the down counter 105 and the subtractor 202.

After the value ($K_1° - \theta_{ij}°$) is subtracted in the subtractor 202 from the predetermined dwell angle $K_2°$, a binary signal indicative of a subtracted value ($K_1° - \theta_{ij}° - K_2°$) is applied by the subtractor 202 to the down counter 203. When the counter 203 is reset by a reset signal d, as previously described, a predetermined number of angular signals b corresponding with the value ($K_1° - \theta_{ij}° - K_2°$) are counted down to zero by the counter 203. Then, a low level signal $i_1$ appears from the flip-flop 204 in response to an output signal g issued from the counter 203 and is applied to the ignitor 9a to energize the ignition coil 9 at the dwell angle $K_2°$.

Meanwhile, when the down counter 105 is reset by the reset signal d, a predetermined number of the angular signals b corresponding with the subtracted value ($K_1° - \theta_{ij}°$) are counted down to zero by the counter 105. Then, an output signal h appears from the counter 105 and is applied to the terminals S of the flip-flop 204. When the flip-flop 204 generates a high level signal $i_2$ in response to the output signal h, the high level signal $i_2$ is applied as an ignition timing signal to the ignitor 9a to deenergize the ignition coil 9.

In summary, during travel of the vehicle, it will be understood that the ignition control apparatus 8 produces an ignition timing signal in response to a reset signal d at each half crankshaft rotation by using the value $\theta_{ij}°$ from the discriminator 102.

Figure 6:
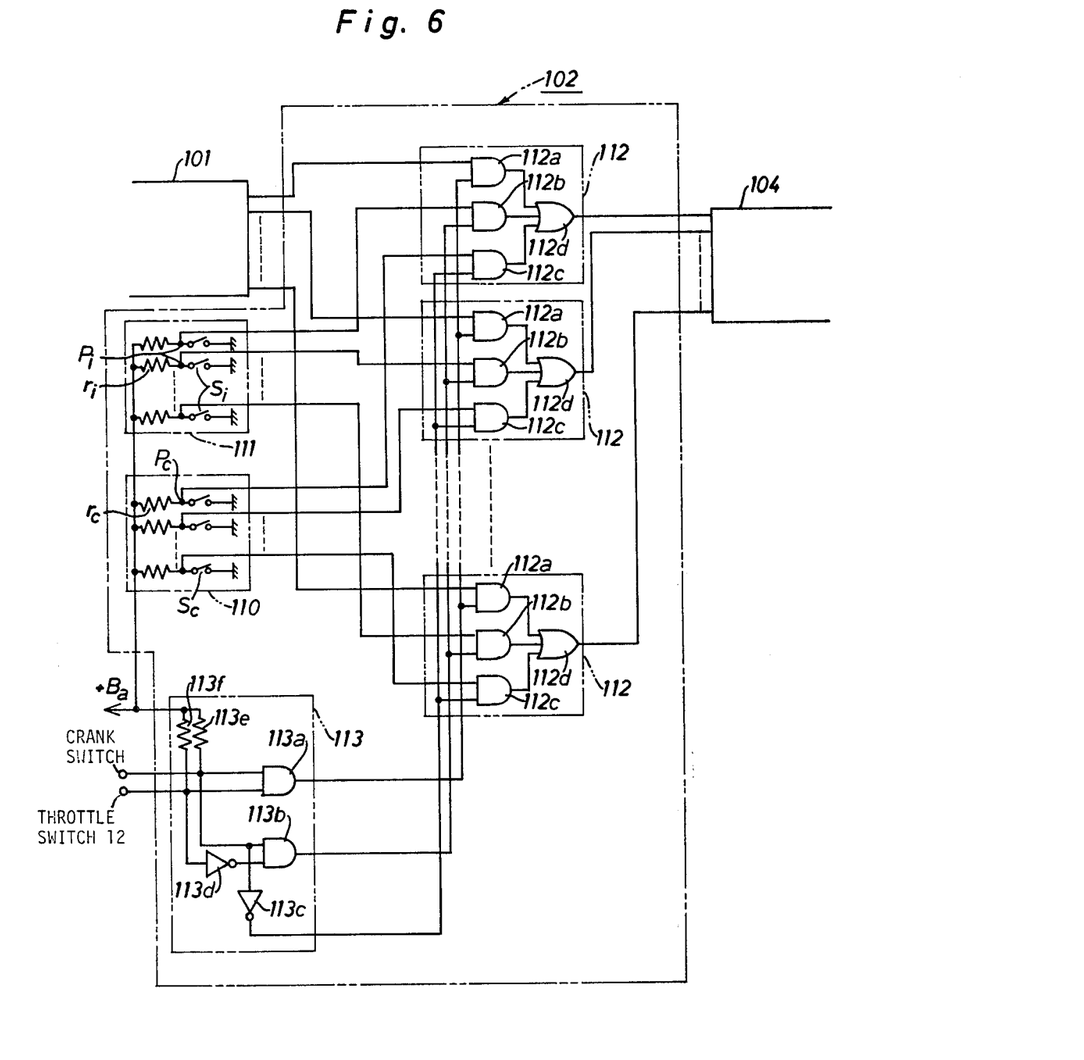
FIG. 6 is a circuit diagram of an embodiment of the spark advance angle discriminator illustrated in block form in FIG. 3.

In FIG. 6, there is illustrated an embodiment of the discriminator 102 which comprises a plurality of selector circuits 112 for selecting one of binary signals from ROM 101 and first and second advance angle signal generators 110 and 111 in response to binary signals from a logic circuit 113. The logic circuit 113 includes an AND gate 113a for generating a low level signal therefrom when at least one of the crank switch and the first throttle switch 12 is closed. In this case, input terminals of AND gate 113a are respectively grounded through the crank switch and the first throttle switch 12. When the crank switch and the throttle switch 12 are opened, AND gate 113a receives an electric voltage from a battery Ba through resistors 113e and 113f to generate a high level signal therefrom. The logic circuit 113 further includes an AND gate 113b for generating a low level signal therefrom when the crank switch and the throttle switch 12 are opened. When the crank switch is closed under opening the throttle switch 12, AND gate 113b also generates a low level signal therefrom due to function of an inverter 113d. When the crank switch is opened and the throttle switch 12 is closed, the voltage from the battery Ba is applied to the first input terminal of AND gate 113b through the resistor 113e. Simultaneously, the inverter 113d is grounded at its input terminal to generate a high level signal which is applied to the second input terminal of AND gate 113b. Then, AND gate 113b generates a high level signal therefrom. An inverter 113c is provided to generate a low level signal when the crank switch is opened. When the crank switch is closed, the inverter 113c generates a high level signal therefrom.

The first advance angle signal generator 110 comprises a plurality of series circuits respectively composed of a switch Sc and a resistor $r_c$. These series circuits are connected in parallel to each other between the battery Ba and the ground. Each series circuit receives the electric voltage from the battery Ba upon opening the switch Sc to generate a high level signal at a junction Pc. When each switch Sc is closed, each series circuit is grounded to generate a low level signal at the junction Pc. In the generator 110, a first predetermined advance angle $\theta_1°$ necessary for cranking operation of the engine E is previously set by opening and closing each switch Sc.

The second advance angle signal generator 111 comprises a plurality of series circuits respectively composed of a switch Si and a resistor $r_i$. These series circuits are connected in parallel to each other between the battery Ba and the ground. Each series circuit receives the electric voltage from the battery Ba under opening the switch Si to generate a high level signal at a junction Pi. When each switch Si is closed, each series circuit is grounded to generate a low level signal at the junction Pi. In the generator 111, a second advance angle $\theta_2°$ necessary for idle operation of the engine E is previously set by opening and closing each switch Si.

Each selector circuit 112 comprises three AND gates 112a to 112c and an OR gate 112d. Each AND gate 112a transfers the binary signal from ROM 101 to the subtractor 104 through each OR gate 112d only when AND gate 113a generates the high level signal. Only when AND gate 113b generates the high level signal, each AND gate 112b applies the high or low level signal from each series circuit of the signal generator 111 as a binary signal indicative of the second predetermined advance angle $\theta_2°$ to the subtractor 104 through each OR gate 112d. Further, each AND gate 112c applies the high or low level signal from each series circuit of the signal generator 110 as a binary signal indicative of the first predetermined advance angle $\theta_1°$ to the subtractor 104 through each OR gate 112d only when the inverter 113c generates the high level signal.

In operation of the discriminator 102, when the crank switch and the first throttle switch 12 are opened, a high level signal appears from AND gate 113a and low level signals appear from AND gate 113b and the inverter 113c respectively. Then, the binary signal from ROM 101 is transferred by each AND gate 112a to each OR gate 112d in response to the high level signal from AND gate 113a and, in turn, transferred by each OR gate 112d to the subtractor 104. In this state, the binary signals from the signal generators 110 and 111 are blocked by each AND gate 112b and 112c in response to the low level signals from AND gate 113b and the inverter 113c.

When the crank switch and the throttle switch 12 are closed, low level signals appear from AND gates 113a and 113b and a high level signal appears from the inverter 113c. Then, only the binary signal from the signal generator 110 is applied by each AND gate 112c to each OR gate 112d in response to the high level signal from the inverter 113c and, in turn, applied to the subtractor 104.

When the crank switch is opened under closing the throttle switch 12, low level signals appear from AND gate 113a and the inverter 113c and a high level signal appears from AND gate 113b. Then, only the binary signal from the signal generator 111 is applied by each AND gate 112b to each OR gate 112d in response to the high level signal from AND gate 113b and, in turn, applied by each OR gate 112d to the subtractor 104.

Moreover, in the above embodiment, an interpolator may be coupled with ROM 101 to improve precision of each optimum advance angle $\theta_{ij}°$ defined by the binary signal from ROM 101 to the discriminator 102. In this case, the interpolator functions to calculate a value $\theta_a°$ between optimum advance angles $\theta_{i-1,j}°$ and $\theta_{ij}°$ from the following relationship.

$$\theta_a° = \frac{(\theta_{ij}° - \theta_{i-1,j}°) N}{N_i - N_{i-1}} + \theta_{i-1,j}°$$

where the optimum advance angle $\theta_{i-1,j}°$ or $\theta_{ij}°$ indicates a value in a range defined by amounts $Ga_{j-1}$ and $Ga_j$ of the sucked air in FIG. 5. Other values between optimum advance angles $\theta_{i,j-1}°$ and $\theta_{ij}°$ and between optimum advance angles $\theta_{i-1,j-1}°$ and $\theta_{ij}°$ may be also respectively calculated by the interpolator from relationships similar to the above-noted relationship.

Figure 7:
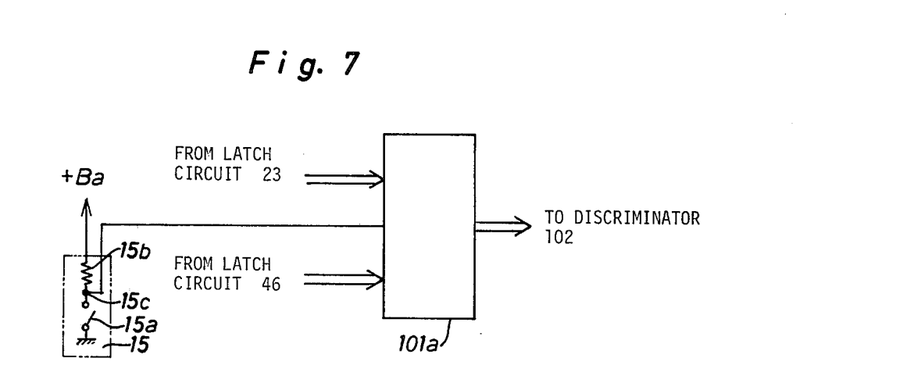
FIG. 7 illustrates a modified portion of the circuit diagram of the ignition control apparatus shown in FIG. 3.

In FIG. 7, there is illustrated a modified portion of the first calculation circuit 100 in which another ROM 101a is replaced with the above-noted ROM 101, and an exhaust gas recirculation or EGR sensor 15 is connected to ROM 101a. The EGR sensor 15 is operatively coupled to an exhaust gas recirculation or EGR device of the engine E and comprises a switch 15a in series with a resistor 15b. When the switch 15a is opened in response to activation of the EGR device, the EGR sensor 15 is supplied with electric voltage from the battery Ba through the resistor 15b to generate a high level signal at a junction 15c between the switch 15a and the resistor 15b. When the switch 15a is closed in response to deactivation of the EGR device, the EGR sensor 15 is grounded at the junction 15c to generate a low level signal at the junction 15c. The low or high level signal from the sensor 15 is applied to ROM 101a.

ROM 101a previously stores therein as a first data the data shown in FIG. 5. ROM 101a also previously stores therein a second data indicating a plurality of optimum advance angles $\theta_{mn}°$ in relation to a rotation speed $N_m$ and an amount $Ga_n$ of the sucked air. In this case, the second data is modified from the first data in consideration with exhaust gas recirculation to the engine E. When the high level signal appears from the sensor 15, an optimum advance angle in relation to the instant rotation speed N and the instant amount Ga of the sucked air respectively defined by the binary signals from the latch circuits 23 and 46 is read out as a value $\theta_{mn}°$ in a specified range defined by rotation speeds $N_{m-1}$ and $N_m$ and amounts $Ga_{m-1}$ and $Ga_m$ of the sucked air, the instant rotation speed N and the amount Ga of the sucked air being in the above specified range. When the low level signal appears from the EGR sensor 15, the optimum advance angle is read out as a value $\theta_{ij}°$ in the specified range defined by the rotation speeds $N_{i-1}$ and $N_i$ and the amounts $Ga_{i-1}$ and $Ga_i$ of the sucked air. The value $\theta_{mn}°$ or $\theta_{ij}°$ is applied as a binary signal to the discriminator 102.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An electronic ignition control apparatus for an internal combustion engine having an output shaft rotated by a piston, an ignition coil adapted to generate a spark voltage upon de-energization of the primary winding thereof, a spark plug activated by the spark voltage to ignite the air-fuel mixture metered into a combustion chamber of said engine so as to operate said piston, and an exhaust gas recirculation device to recirculate exhaust gas into the combustion chamber of said engine, the control apparatus comprising:
 a first signal generator for producing a first signal at a predetermined angular interval of rotation of said output shaft;
 a second signal generator for producing a second binary signal indicative of an instant rotation speed N of said output shaft in response to the first signal;
 a third signal generator for producing a third binary signal indicative of an instant amount Ga of the sucked air into the combustion chamber of said engine in response to the first signal;
 a fourth signal generator coupled with said exhaust gas recirculation device for producing fourth and fifth signals respectively indicative of activation and deactivation of said exhaust gas recirculation device;
 a single memory means for storing first data indicating an optimum spark advance angle for activation of said spark plug in relation to the instant rotation speed N and the instant amount Ga of the sucked air in consideration with exhaust gas recirculation of the combustion chamber of said engine, which optimum spark advance angle is given by a value $\theta_{ij}°$ which is indicated in a specific range defined by rotation speeds $N_{i-1}$ and $N_i$ and amounts $Ga_{j-1}$ and $Ga_j$ of the sucked air in the form of a table or map, said memory means further storing second data indicating an optimum spark advance angle for activation of said spark plug in relation to the instant rotation speed N and the instant amount Ga of the sucked air, which optimum spark advance angle is give by a value $\theta_{ij}°$ which is indicated in the specific range represented in said table or map, said memory means producing a sixth binary signal representing the first-named optimum spark advance angle in accordance with the second and third binary signals in response to the fourth signal and producing a seventh binary signal representing the second-named optimum spark advance angle in accordance with the second and third binary signals in response to the fifth signal;
 a timing signal generator for generating a timing signal in accordance with one of the sixth and seventh binary signals; and
 means for de-energizing the primary winding of said ignition coil in response to the timing signal.

* * * * *